G. H. FAYMAN.
ATTACHING TAGS TO MAIL BAGS.

No. 178,130. Patented May 30, 1876.

Attest:
H. L. Perine
W. E. Chaffee

Inventor.
Geo. H. Fayman.
By J. J. Coombs
Attorney

UNITED STATES PATENT OFFICE.

GEORGE H. FAYMAN, OF WASHINGTON, DISTRICT OF COLUMBIA.

IMPROVEMENT IN ATTACHING TAGS TO MAIL-BAGS.

Specification forming part of Letters Patent No. 178,130, dated May 30, 1876; application filed April 18, 1876.

*To all whom it may concern:*

Be it known that I, GEORGE H. FAYMAN, of the city of Washington and District of Columbia, have invented a new and useful Device for Attaching Tags to Mail-Bags, which is fully set forth in the following specification, reference being had to the accompanying drawings.

The wooden tags attached to mail-bags, with labels to indicate their destination, have heretofore been attached by means of a strong twine or cord, requiring to be tied on attaching the tag and to be cut to detach it. This involved the expenditure of considerable time in attaching the tags and the consumption of a large amount of twine.

The object of this invention is to provide a more expeditious means of attaching and detaching such tags, and also to save the consumption of twine. It consists in a hook, to be attached to the bag, made of elastic wire, and so constructed that the tag may, with the exertion of a little manual force, be sprung into the hook, and will be retained there without liability to be accidentally detached, but may be removed therefrom by another slight application of manual force, both the attaching and detaching being performed very quickly.

Figure 1:
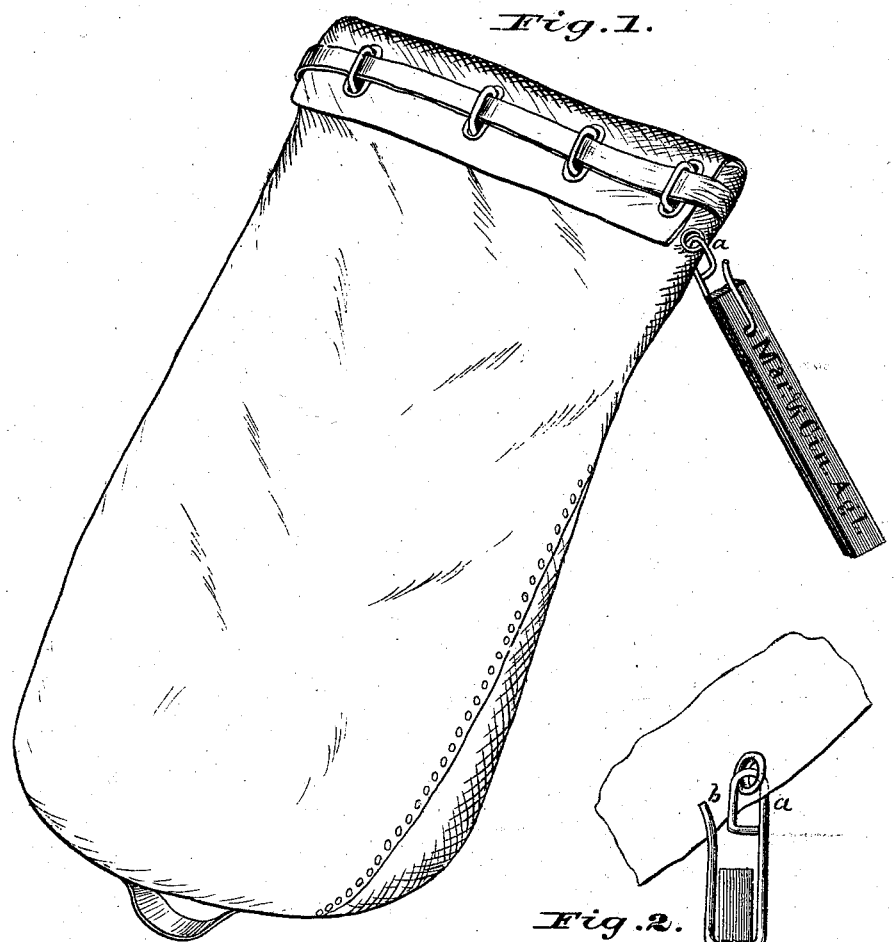
Figure 2:
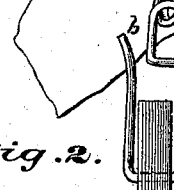
Figure 3:
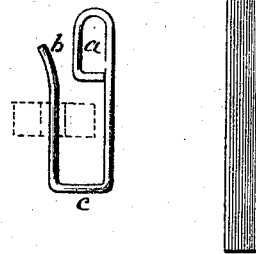

In the accompanying drawings, Figures 1 and 2 represent the hook and tag attached to a mail-bag, and Fig. 3 the hook unattached to the bag.

The hook is formed with a loop or eye, $a$, for attaching it to the bag, and the point of the hook comes up near to, but not quite in contact with, said eye, leaving a narrow space, $b$, between the metal of the eye and the point of the hook, which is slightly bent outward, as shown in the drawings. This space $b$ is not as wide as the thickness of the wood on each side of the hole in the tag; consequently, the tag can neither be attached nor detached without springing out the point of the hook; but a slight application of manual power will force the tag upon the hook, where it will be securely held until removed by a similar application of manual power, without any liability to be detached by accident. The hook may be made of steel or brass wire, or of any other metal possessing a sufficient degree of elasticity.

To adapt the hook to be permanently attached to a mail-bag, and to receive and securely hold a wooden tag, such as is used in the mail service, and is shown in the drawings hereto annexed, and allow the same to be readily and easily attached and detached, it must have certain peculiarities, to wit: first, an eye or loop or equivalent means for attaching it permanently to the bag; second, it must have an open space, $b$, wide enough to allow the tag to be easily sprung into the hook, and detached therefrom, and yet not so wide as to permit the tag to be accidentally detached; and, third, it must have a substantially square bend at the bottom, as shown at $c$.

What I claim as my invention, and desire to secure by Letters Patent, is—

The combination of a mail-bag with a spring-hook, substantially as herein described, permanently attached thereto, and adapted to receive and securely hold a wooden tag of the form shown, and to allow the same to be easily detached therefrom.

GEO. H. FAYMAN.

Witnesses:
WILLIAM G. SMOOT,
S. R. KILBY.